May 2, 1933.  F. A. RICHARDS  1,906,717
HORSE COLLAR
Filed Nov. 5, 1929   2 Sheets-Sheet 1

INVENTOR
F. A. Richards
BY
ATTORNEYS

May 2, 1933.  F. A. RICHARDS  1,906,717
HORSE COLLAR
Filed Nov. 5, 1929   2 Sheets-Sheet 2

CONTACT UNDER PRESSURE

CONTACT WITH PRESSURE RE-LEASED

INVENTOR
BY
ATTORNEYS

Patented May 2, 1933

1,906,717

UNITED STATES PATENT OFFICE

FOREST A. RICHARDS, OF EAU CLAIRE, WISCONSIN, ASSIGNOR TO AIR CUSHION DEVELOPMENT HORSE COLLAR COMPANY, OF OMAHA, NEBRASKA, A CORPORATION OF NEBRASKA

HORSE COLLAR

Application filed November 5, 1929. Serial No. 404,881.

This invention relates to horse collars, and more particularly to collars of the cushion type, and to methods of making the same.

To perform perfectly the functions required of it, a horse collar should be constructed in such fashion and of such material that it will present, when under load pressure, as wide a contact or bearing surface as possible and conform to those parts of the animal best adapted to bear the load pressure, as the shoulders and contiguous parts. At the same time, the material should have the quality of bearing easily on and avoiding harsh contacts with the animal. Further, the material composing the collar should be of such nature that it will resist wear and decay due, among other causes, to animal and other moistures. While various horse collars have been presented to the art in efforts to meet these and other requirements, they have all been lacking, in some respect or another.

The present invention, therefore, has for general objects to provide a horse collar which shall be extremely easy in wear on the animal, of sound construction, and wear-resistant and proof against decay. It shall also be simple and easy to make, and economical in manufacture, and use.

To these ends, the invention contemplates a resilient or pneumatic waterproof horse collar having a rubber-lined tube or tubes forming the after-wales, the exposed surfaces of the inner or throat sides of which after-wales shall also be made of rubber. Such a construction will present a yielding surface upon contact with the animal, when under load pressure. Further, by making the after-wales in curved or rounded formation in their lower portions, where they abut against the shoulders of the animal, only a comparatively narrow contact or bearing surface will normally be presented. Under load pressure, however, and due to the resilient nature of the material forming the after-wales, and their curved or rounded formation, these parts will spread and present a greatly widened contact or bearing surface, reverting, however, to the original narrow surface, when released from the load pressure, and by this reversion decreasing the area of contact with the animal and permitting ventilation and evaporation of moisture. With these after-wales are combined fore-wales made of material of the necessary stiffness, the fore and after-wales being covered with rubberized fabric in such manner as to join all the component parts of the collar into one integral or unitary structure.

In the constructions of the prior art in which pneumatic after-wales are proposed, the collar is made up of a distinct outer cover or casing (usually leather) and a separate inner rubber tube which, after being inserted within the casing, can be inflated to give form to the collar and adapt it for use. This type of collar, aside from being expensive to manufacture, is not uniform and reliable in its action. The unitary structure herein contemplated, therefore, is a prime feature of the invention because, among other reasons, it permits the collar to be made quickly and at a greatly reduced labor cost, while at the same time it affords a structure which is strong and durable and thoroughly efficient for its purpose. Furthermore, it permits a method of construction which insures a uniform and reliable product.

Figure 1:
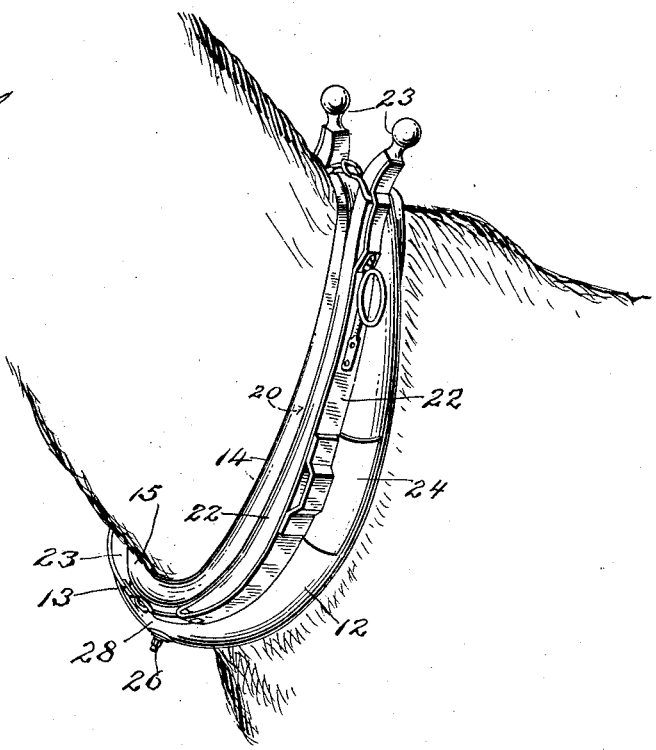
Fig. 1 is a fragmentary perspective view of a horse-collar made in accordance with the principles of the invention and shown in normal position upon a horse.
Figure 2:
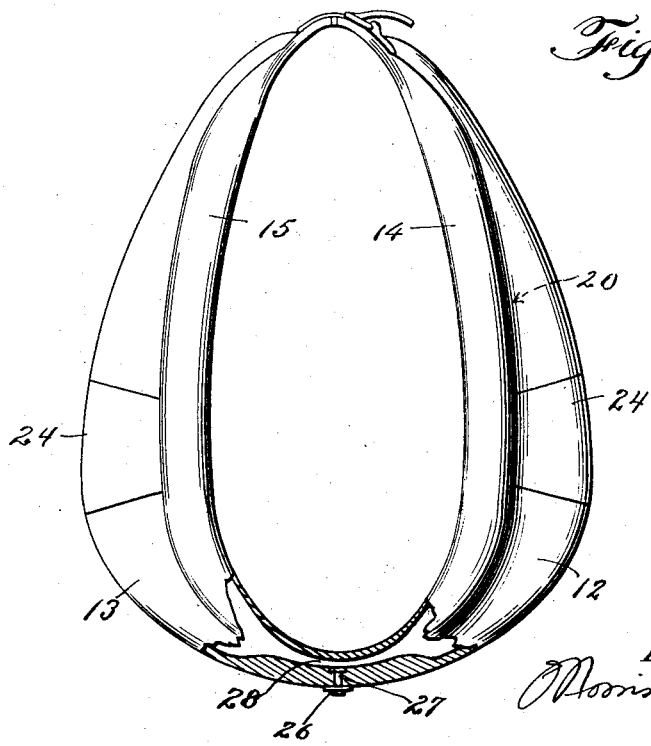
Fig. 2 is a front elevation of the collar.
Figure 4:
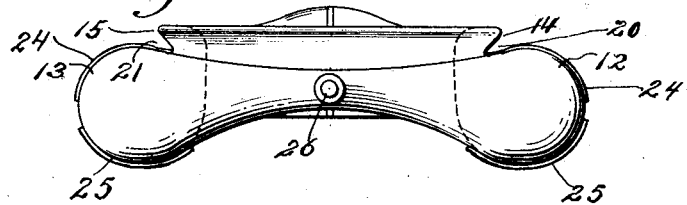
Fig. 4 is a bottom plan view partly in section.
Figure 3:
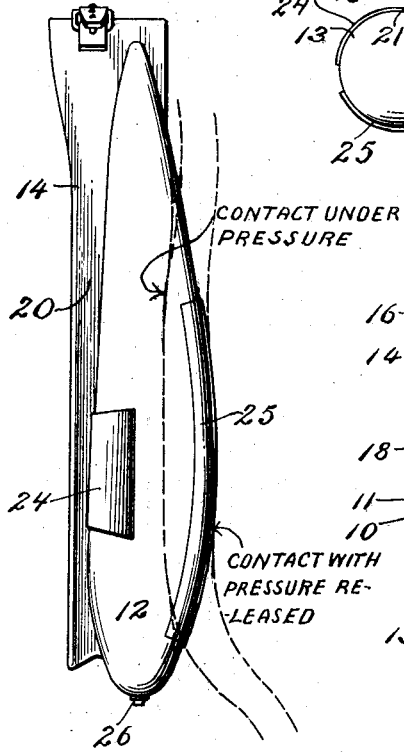
Fig. 3 is a side view of the collar in normal position, the contact line of same, when under load pressure being indicated in dotted lines.
Figure 5:
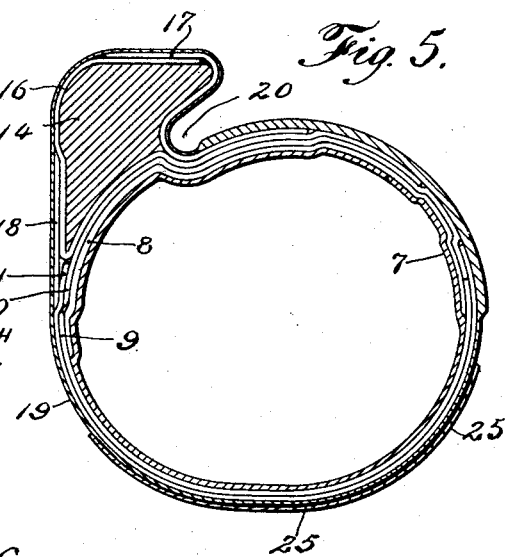
Fig. 5 is a transverse section of part of a collar.

Referring in detail to the drawings, and first to Figs. 1–5, inclusive, the preferred embodiment of the invention shown therein comprises an inner tube 7, see Fig. 5, which may be made of any suitable material lending itself to resiliency and non-porosity, but which, and as shown, is preferably composed of rubber. The tube is shaped to the form of the collar and, for the reasons heretofore given, is curved or rounded out at those portions spaced from its opposite ends forming the bows, see Fig. 2, where the greatest load pressures occur (i. e., where the traces of the harness are connected to the hames on the collar, see Fig. 1, and the load pressure is applied upon the pull of the animal). From these points, the tube gradually reduces in bore toward the ends and also toward the middle.

To protect the rubber tube 7 and also to give it more substance and strength, it is covered with a suitable sheathing, which should be of a nature not to interfere with the desired resiliency of the after-wales of the collar, when completed. Preferably, therefore, one or more plies of stout fabric 8, 9, 10 and 11 are spliced lengthwise of the tube, see Fig. 5, these plies being preferably (though not necessarily) rubberized on both sides and being of suitable shape and size to cover the tube throughout its entire length and with proper overlapping effect, the plies 9, 10, and 11, respectively overlapping in step-like fashion the plies 8, 9, and 10.

Being given the shape of the conventional collar it will be noted that the tube 7, as thus reenforced, forms the after-wales 12, 13 of the collar with the rounded enlarged portions or bows in the lower parts of the collar, where they will abut against or contact with the shoulders and contiguous parts of the animal. It is to be particularly noted, however, that, because of the curved or rounded shape of these bows of the after-wales, only a comparatively small or narrow strip of each after-wale will normally be presented for contact with the animal, but that this surface will be increased as the load pressure or pull exerted by the animal is applied, as indicated by the dotted lines in Fig. 3, and the entire contacting or bearing surface will, because of the resiliency of the material composing the after-wales, accommodate itself to the structure of the animal. Upon the cessation of the load pressure or pull, the resiliency of the material will cause the after-wales to snap back or revert to their original shapes, and again present the narrow strips of contact or bearing surface. Moreover, because of this reversion to original form, the parts of the animal and the after-wales, which were in contact, will be exposed and ventilated, and any moisture, whether animal or of other nature, be evaporated.

A horse-collar as above constructed is impermeable to moisture, and the structure thereof, therefore, is not subject to the usual decay suffered by the ordinary devices of this character from the moisture of the animal and the elements.

It is necessary to provide fore-wales to engage and, with the after-wales, hold the hames of the harness securely in place, and these fore-wales, therefore, must be composed of material sufficiently rigid to permit the fore-wales properly to perform their office. This requirement is met by providing on the front edge of the after-wales beads composed, preferably, of hard rubber, see particularly Figs. 1, 2, and 5, which beads are formed, preferably and as shown, of a single element properly shaped to form the fore-wales 14, 15. These beads or fore-wales 14, 15, preferably and as shown, are each covered with plies 16, 17, of rubberized fabric, see Fig. 5, which are applied in overlapping relation lengthwise of the fore-wales and also spliced around the after-wales 12, 13, thus forming an integral structure of the fore and after-wales somewhat in the manner, for example, and with the same effect as a bead is applied to an automobile tire. Preferably, an additional ply 18 of the rubberized fabric, is attached to each pair of fore and after-wales, as shown in Fig. 5, to form a further bond between the members of each said pair. Preferably, also, an outer ply of rubber 19 of any desired thickness is laid around or over the entire rubberized fabric or structure to embed the same completely and produce a smooth moisture-proof exterior surface to the completed collar. These beads or fore-wales 14, 15, are preferably and as shown, see Fig. 5, of triangular shape and form with the after-wales recesses 20, 21, in which the hames 22, 23, of the harness are securely held.

On the outer surface of each after-wale, where the trace bears against it when load pressure is applied, preferably and as shown, a reenforcing tab 24 is attached, this tab likewise being made of the rubberized fabric.

The inner exposed contact or bearing surface of each after-wale, also, is preferably covered with an extra ply of rubber 25, which makes a smoother and softer bearing surface to present to the animal and gives additional protection against the moisture of the animal at a place where most needed.

In order that the tube forming the after-wales 12, 13, may be properly inflated, an air bag valve 26 is inserted in an orifice 27 formed in the tube at a suitable point, preferably and as shown, in the lower center of the throat of the collar.

The tube at this point is reduced in bore in order to form a restricted passage 28, between the after-wales so that when the after-wale on one side is distorted under load, the air will not suddenly be forced thru the throat of the tube or collar to the other after-wale and thus unduly expand the last named after-wale, while reducing the supply of air in the after-wale under load to such an extent as to impair its efficiency. By properly restricting the passage between the after-wales, however, the air will be impeded in its passage to such an extent that proper air pressure will be maintained in each after-wale.

The method of making the horse-collar thus described should be clear from the foregoing description, but the preferred method may be briefly summarized by saying that there is provided a semi-cured rubber tube having rounded portions at points spaced from the ends of the tube and a restricted bore at its central part. Plies of rubberized fabric are then spliced lengthwise of the tube completely to cover the same and overlap, the plastic rubber of the plies causing the latter to adhere to the tube. The tube is next bent into the conventional form of horse-collar, the resulting arms or loops of the tube forming the after-wales of the collar. To form the fore-wales a stiff rubber element, bent to correspond with the bend of the tube, is joined integrally thereto by covering both tube and member with plies of the rubberized fabric laid lengthwise and over-lapping. If desired an outer ply of rubber of whatever thickness chosen may then be laid over or around the rubberized fabric structure to embed the same completely and produce a smooth moisture-proof exterior surface to the completed collar. The throat of the collar thus composed is formed with an orifice through which is inserted an air valve for inflating the collar when in use. Reenforcing tabs of rubber are then placed on the outer and inner exposed sides of the after-wales, and the whole combination of component parts is then vulcanized together to form an integral or unitary structure.

While the method above described is entirely satisfactory, it will be understood that the collar may be made in any other manner suitable for the purpose. The principal point contemplated is to make the collar in one integral structure so as to do away with the special inner tube and the separate outside casing of the prior art constructions. Merely to make the collar of rubber would not be enough, but by employing rubberized fabric plies, as in the manner described, the desired result can be attained, since the fabric plies, while not interfering with the resiliency of the after-wales, will resist the bursting pressure exerted thereon by the contained air when the collar is in use and subjected to heavy loads. The presence of the rubberized fabric is unobjectionable because it is completely embedded in rubber and hence is thoroughly insulated, both as regards the absorption of moisture which would tend to rot and weaken it, and as regards the leakage of air from the interior air chamber. In other words, the collar will act the same as if it were made wholly of rubber and yet will be free from the objections which would necessarily be present if made wholly of rubber.

Figure 6:
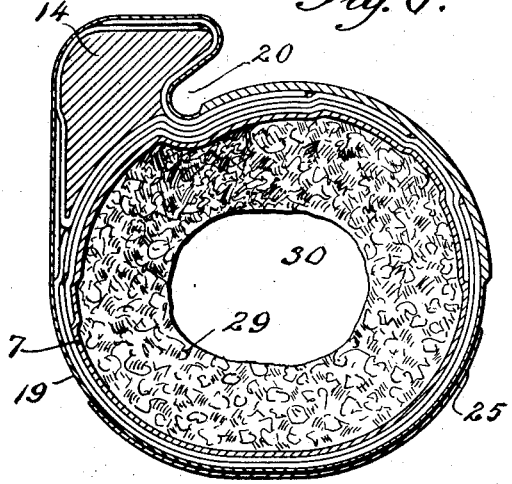
Fig. 6 is a transverse section of part of a modification.

A modification of the invention is illustrated in Fig. 6, this modification varying from the embodiment of the invention heretofore described in that the tubular after-wales are each lined with a spongy mass of rubber 29 which is vulcanized to the rubber of the tube to make it a part thereof. While this spongy rubber mass could be made completely to fill each loop of the tube, in the preferred form as shown in Fig. 6, the spongy mass 29 is formed with a central air chamber or cavity 30. An advantage of this modified structure is that, without sacrificing the expansible and resilient qualities of the embodiment first described, it provides for particular conditions of use a collar with more body and substance than has said first described embodiment. It is made generally in the same manner as the first described embodiment with the exception that, when the tube is provided, it is lined with the spongy mass of rubber and the latter is vulcanized to the tube.

It will be noted that a horse-collar made in accordance with the principles of the invention will have numerous advantages. For example, it will be very light in weight; will have a very great load-bearing surface when under load pressure, and will adjust itself to any unusual bearing surfaces. It will remain permanently soft and pliable. Because of this capability of extension, adjustment and softness and pliability, it relieves the shoulder and upper muscles and nerves of the horse from severe usage, and diseases caused by the collars in common use are avoided. It will lessen the strain of starting and will help an animal to do more work and do it more easily. It has no seams to rip open and is easily repaired. Other advantages will be apparent to those skilled in the art.

In its broader aspects, the invention is not limited to the particular embodiments shown and described nor to the particular sequence of operations mentioned, as many changes may be made in the details thereof without departing from the spirit of the invention or sacrificing its chief advantages.

I claim:

1. A horse collar comprising a rubber tube, one or more layers of rubberized fabric covering the same, said tube and layers being bent to form after-wales, fore-wales formed of stiff material, and one or more layers of rubberized fabric covering said fore-wales and uniting them to the respective after-wales.

2. A horse collar comprising a rubber tube, one or more layers of rubberized fabric covering the same, said tube and layers being shaped to form after-wales, fore-wales formed of stiff material, layers of rubberized fabric covering said fore-wales and uniting them to the respective after-wales in an integral structure, and an outer rubber cover applied at least to the exposed throat surfaces of the after wales.

3. A horse collar comprising a rubber tube, layers of rubberized fabric covering the same, said tube and layers being shaped to form after-wales, fore-wales formed of hard rubber, and layers of rubberized fabric covering said fore-wales and uniting them to the respective after-wales.

4. A horse collar comprising a rubber tube, layers of rubberized fabric laid thereon lengthwise, said tube and layers being shaped to form after-wales, fore-wales formed of stiff material, layers of rubberized fabric covering said fore-wales and uniting them to the respective after-wales.

5. In or for a horse collar, an after-wale formed of elastic tubing, and moisture-proof fabric covering said tubing and forming therewith an integral structure.

6. A horse collar comprising after-wales formed of rubber tubing, moisture-proof fabric covering said tubing and forming therewith an integral structure, fore-wales, and fabric covering said fore-wales and uniting them to said after-wales.

7. A horse collar comprising after-wales formed of rubber tubing, rubberized fabric covering said tubing and forming therewith an integral structure, fore-wales, and rubberized fabric covering said fore-wales and uniting them to said after-wales.

8. A horse collar comprising after-wales formed of rubber tubing, rubberized fabric covering said tubing and forming therewith an integral structure, fore-wales, rubberized fabric covering said fore-wales and uniting them to said after-wales, and means forming a tubular connection between said after-wales.

In testimony whereof, this specification has been duly signed.

FOREST A. RICHARDS.